(12) United States Patent
Karrman et al.

(10) Patent No.: US 12,504,532 B2
(45) Date of Patent: Dec. 23, 2025

(54) OBJECT DETECTION AND STATE ESTIMATION FROM DEEP LEARNED PER-POINT RADAR REPRESENTATIONS

(71) Applicant: GM Cruise Holdings LLC, San Francisco, CA (US)

(72) Inventors: Anton Mario Bongio Karrman, San Francisco, CA (US); Kotung Lin, San Carlos, CA (US); Xiaowei Li, Saratoga, CA (US); Weizhe Zhang, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 495 days.

(21) Appl. No.: 17/674,533

(22) Filed: Feb. 17, 2022

(65) Prior Publication Data

US 2023/0258794 A1 Aug. 17, 2023

(51) Int. Cl.
*G01S 13/89* (2006.01)
*G01S 13/931* (2020.01)

(52) U.S. Cl.
CPC .......... *G01S 13/89* (2013.01); *G01S 13/931* (2013.01)

(58) Field of Classification Search
None
See application file for complete search history.

(56) References Cited

U.S. PATENT DOCUMENTS

2021/0311169 A1 10/2021 Liu et al.
2022/0044359 A1* 2/2022 Harrison .............. G06T 3/4061

OTHER PUBLICATIONS

Eugen Schubert et al. "Clustering of high resolution automotive radar detections and subsequent feature extraction for classification of road users", Jun. 2015, IEEE, 16th International Radar Symposium, p. 174-179 (Year: 2015).*
Korthals, Timo, et al. "Multi-Modal Detection and Mapping of Static and Dynamic Obstacles in Agriculture for Process Evaluation." Frontiers in Robotics and AI, Mar. 27, 2018, 23 pages.
Extended European Search Report dated Jul. 18, 2023, for the corresponding European Patent Application No. 23151298.9.

* cited by examiner

*Primary Examiner* — Hongye Liang
(74) *Attorney, Agent, or Firm* — CANTOR COLBURN LLP (57) ABSTRACT

A current set of radar data may be combined with previous sets of radar data to create a combined set of radar data. Each of these sets of radar data and the combined set of radar data may include various data points and each of these data points may be associated with certain specific features or classifications. The set of combined data may then be pre-processed to identify distances to associate with certain data points, locations to associate with those data points, and velocities associated with the data points such that each of the respective data points may be mapped and tagged with data that identifies identify positions, velocities, and other physical details of the respective data points. This pre-processed data may then be processed by a machine learning process to identify kinematic information that may then be provided to a tracking system of an AV.

10 Claims, 4 Drawing Sheets

OBJECT DETECTION AND STATE ESTIMATION FROM DEEP LEARNED PER-POINT RADAR REPRESENTATIONS

BACKGROUND

1. Technical Field

The present disclosure is generally related to evaluating data from different modes of a sensing apparatus. More specifically, the present disclosure is directed to solutions that mitigate limitations of particular modes of operation of a sensing apparatus.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions that are conventionally performed by human drivers, such as performing navigation and routing tasks necessary to provide safe and efficient transportation. Such tasks may require the collection and processing of large quantities of data using various sensor types, including but not limited to cameras and/or Light Detection and Ranging (LiDAR) sensors, and radio detection and ranging (radar) elements disposed on the AV.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Methods and apparatuses associated with the present disclosure consolidate data of a radio detection and ranging (radar) system to improve performance of a subsequent perception, prediction, and/or planning system. A radar device may acquire radar data from a current set of received radar signals. Data of this current set of radar signals may be represented as points with features for a current frame around an Autonomous Vehicle (AV). This sensing system may also have stored data that describes points of previous frames around the AV.

A current set of radar data may be combined with previous sets of radar data to create a combined set of radar data. The set of combined points, which may be referred to as a fused radar point cloud, may be preprocessed and/or augmented to add auxiliary information (like semantic map information that indicates drivable versus non-drivable areas) or transform the data in a way that allows a downstream algorithm (especially one that is machine learned) to more easily and accurately process the data.

A memory efficient representation of a current frame or a past frame of data includes sparse radar point clouds that are extracted from densely sampled radar tensors which themselves are the result of processing applied to signals resulting from a monostatic radar's operation. This tensor data may be multi-dimensional and could have a dimension for range, Doppler, and angle (elevation and/or azimuth). Multiple radar sensors or radar modes may be used to provide an AV with different fields of view, different forms of occlusion, different incident view angles, or other information. This diversity in returned signals may reduce ambiguity, increase accuracy, improve signal to noise ratio, or provide other benefits. When multiple sparse radar point clouds from different timestamps are combined, they can be stored in a temporal accumulation buffer. In certain instances, each point cloud could be recorded asynchronously or synchronously. This accumulation buffer may store data from a number of different scans of a scene or area around an AV from different radar sensors extending temporal aggregation to more general multi-sensor temporal aggregation.

A machine learning process may use radar data to estimate scene information (kinematic, geometric, semantic, for example) and may then provide this information to a tracking system of an AV. The machine learning may output information sufficient for instance segmentation; more specifically, a semantic classification that indicates for all radar points what semantic label (for example background, pedestrian, bike, car) most likely caused the scattering of each detected radar point as well as where the centroid of the object is (as a per-point relative offset) that caused the scattering of the detected point if it is indeed not part of the background.

Figure 1:
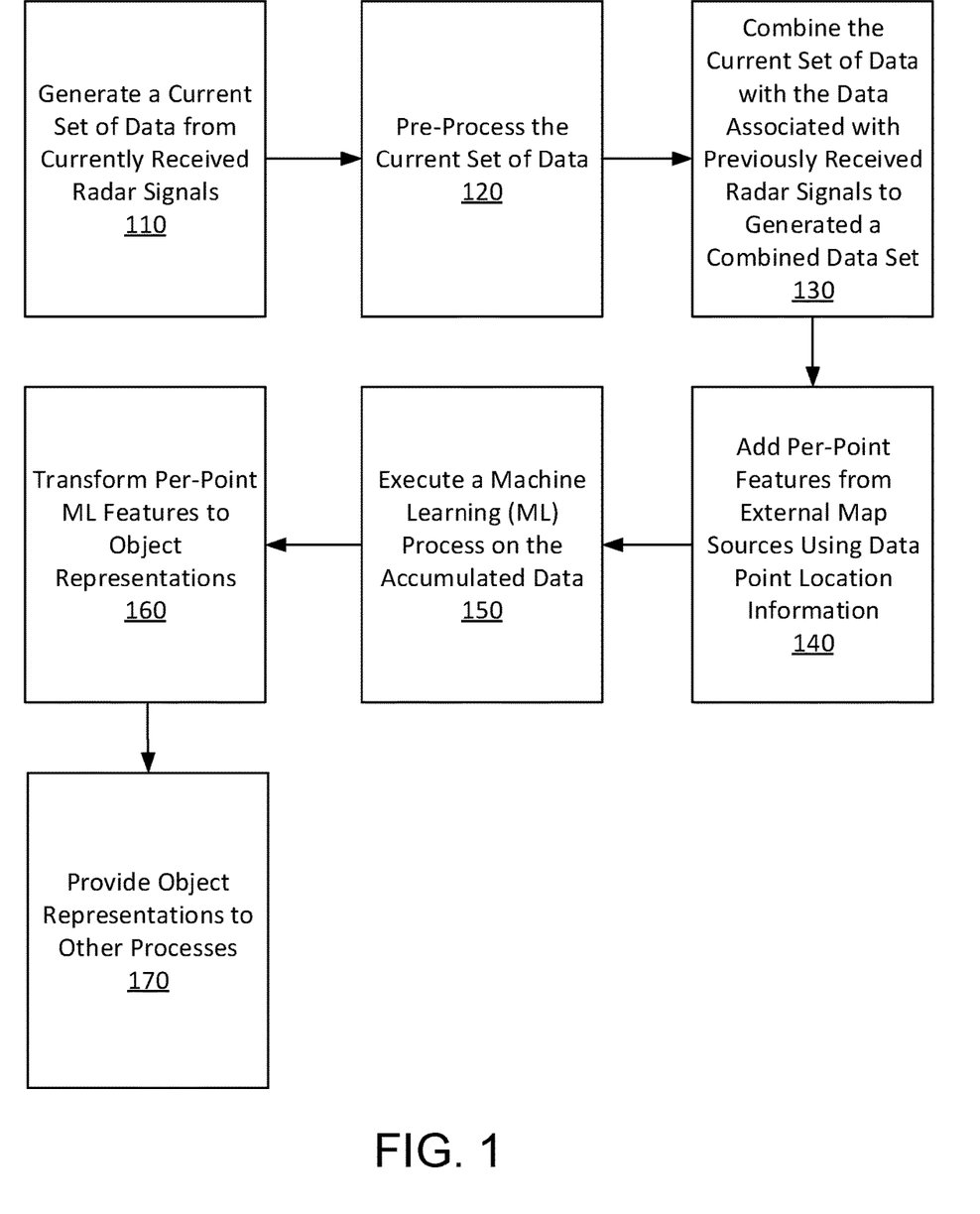
FIG. 1 illustrates a series of steps that may be implemented when data of a radar apparatus is collected, combined, and evaluated.

FIG. 1 illustrates a series of steps that may be implemented when data of a radar apparatus is collected, combined, and evaluated. FIG. 1 begins with a first step 110 where a current set of data (for example, a set sparse radar point cloud data) is generated from a most recently (i.e. a currently) received set of radar signals. This data may have been generated from a set of reflected pulses received after a set of pulses were transmitted from a radar device on an AV. The data generated in step 110 of FIG. 1 represents a single frame of information associated with the scene around the AV (and therefore within view of the radar sensor that generates this information). This data may be associated with radar signals received from multiple radar sensors on an AV. As mentioned above, each of these different radar sensors may be associated with a different field of view with different forms of occlusion, elevation angle, range, and azimuth, for example. Furthermore, each of these different sensors may be associated with different modes of operation. A frame of information may by a dataset that includes data from reflections associated with one or more scans of an area by one or more radars at an AV. A radar scan may include a set of coherent pulses with precise timing that are transmitted from a radar antenna. Once radar signals from a particular scan are transmitted, reflections of transmitted radar scan signals may be received and data relating to the scan may be incorporated into a frame. While time intervals between respective scans may vary, a frame that includes data from one or more scans may be associated with a start time and an end time that spans time of the one or more scans.

In step 120 of FIG. 1, the data generated from the currently received radar signals and data associated with sets of prior data may be pre-processed to transform the data into a representation that is invariant to certain inputs but sensitive to others. Such preprocessing may preserve angles, topological orientations of data points, or information that may be associated with motion vectors of objects in an area around a vehicle while reducing information associated with the specific conditions under which the sensor collected the data, for example reducing noise, accounting for doppler ambiguity, applying $R^4$ compensation for radar magnitude to estimate Radar Cross Section under a point-scattering assumption, and reference frame compensation. The calculations performed in this step may compensate for noise, distance, or other anomalous characteristics of received radar signals.

Next in step 130, the current and prior preprocessed data may be used to generate a fused radar point cloud that includes data from multiple time steps and radar antennas or apparatuses. This point cloud data may identify places around a sensing apparatus from which radar reflections were received. In step 140, locations of data points of the combined data may be identified and used to extract per-point features from external sources (for example, a-priori semantic maps containing road surface type labels).

Next in step 150, the set of data combined in step 130 along with the additional data from step 140 may be provided to a machine learning process. This could be done by a processor that implements algorithms that use the current and past data as input to infer an estimate of the current scene state.

The data points of the current frame and the data points of the previous frames may include information that contains locations of respective data points, magnitudes of radar energy associated with each respective data point, and other information. As mentioned above, this information provides spatial and temporal patterns that machine learning or other models can use to improve inference of the current state of the scene.

In Step 160 of FIG. 1, per-point outputs of the ML process in step 150 are post-processed. These ML outputs include two pieces of inferred information: per-point classification (as background or foreground), and a relative spatial offset. This information may be used to convert from a point-wise representation to object representations using typical instance segmentation methodologies, which are described in more detail as step 270 of FIG. 2. Here point-wise representations may associate individual data points with locations and object based representations may identify specific points that are or that should be associated with an object. After object representations are generated in 160, they are passed downstream in 170 for further use as part of a broader AV system.

Figure 2:
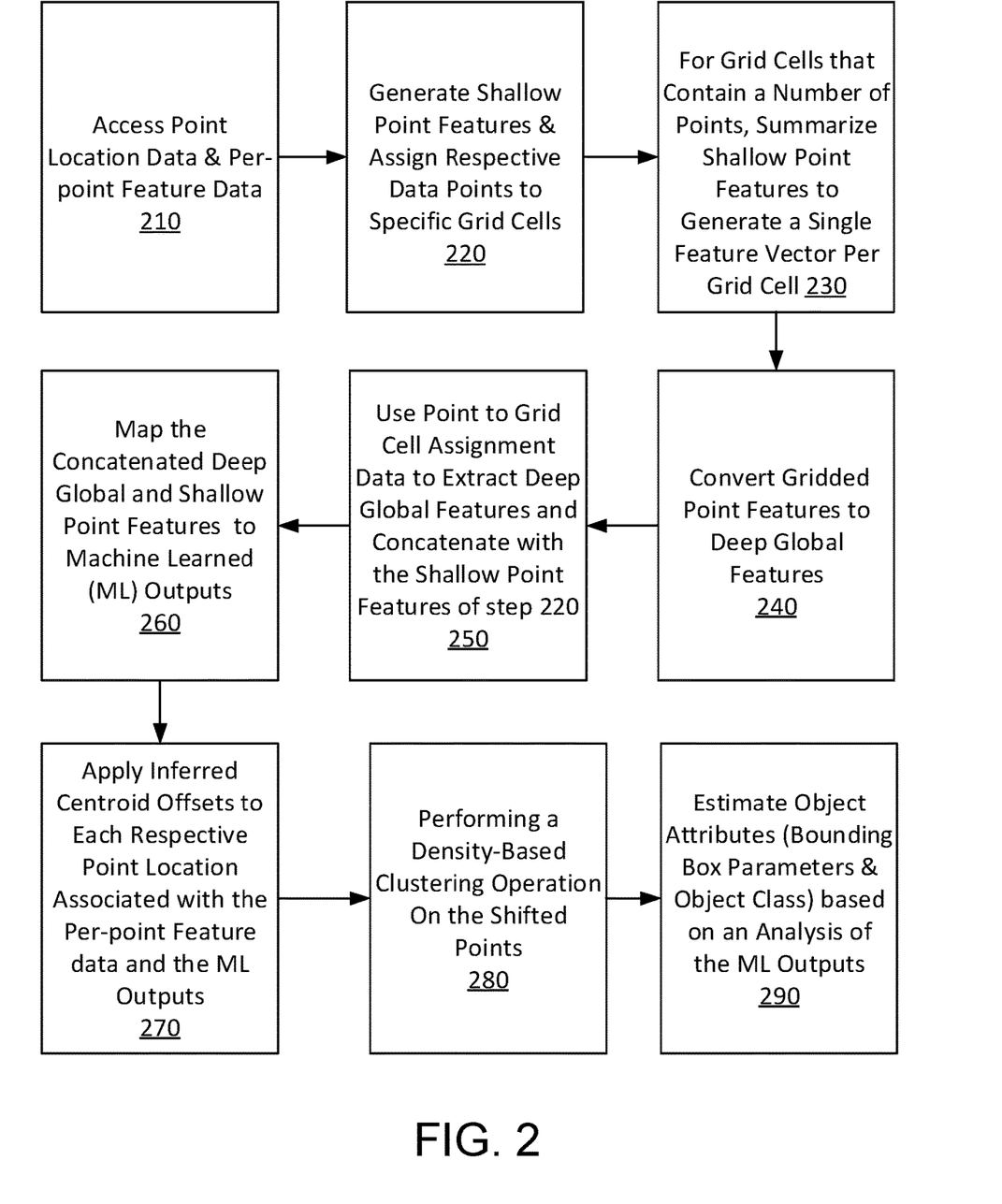
FIG. 2 illustrates a series of steps that may be performed by a machine learning process, the various steps illustrated may be performed by a processor that executes instructions from memory.

FIG. 2 illustrates a series of steps that may be performed by a machine learning process, the various steps illustrated may be performed by a processor that executes instructions from memory. In Step 210 of FIG. 2, radar point cloud data is organized in a way that is amenable to application of a machine learned algorithm. For example, the data may be organized into a matrix where rows of the matrix may correspond to respective data points and columns of the matrix correspond to raw radar features (like approximate RCS or range rate) for each data point. This feature data may include hand engineered features, radar domain-knowledge features, or a combination of both Example radar domain knowledge features for a detected point include radiometric features like radar cross section as well as doppler features such as ambiguous range rate. The data included in this matrix may be data from point clouds of multiple physical radars and multiple temporal frames that have been aggregated and projected into a feature space using domain-specific preprocessing and feature extraction.

After the data point information is organized in step 210, a shared, trainable feature extractor such as a multi-layer perception (MLP) is applied to each point in the matrix in step 220 of FIG. 2. Shared means the same MLP is applied to each point individually. Because each MLP is applied to a single point, the receptive field is limited and thus these features are referred to as shallow features, unlike deep global features (i.e. deep global context features) from a larger receptive field which would combine context across many points. As such, these shallow features may not include data that provides a context between each single point of a set of data points and other points of the set of data points. Shallow feature data may not include any data that links one point to another point, where deep global features may include data that links one point to other points.

In conjunction with the application of the MLP to generate shallow learned features, step 220 also associates points to grid cells. This gridding process (referred to as voxelization when the elevation dimension is gridded or pillarization when non-elevation dimensions are gridded) converts shallow point features to a stack of gridded feature maps. A variable number of feature vectors belonging to points associated to a grid cell may be summarized using a permutation-invariant operation like sum or max, per feature, reducing across the variable number of points in step 230. This may include generating a single feature vector for each grad cell that contains some number of points. Grid cells with no assignments may be assigned a zero vector value. Such a grid may include a series of grid cells with a sample spacing of 1 meter by 1 meter from a top-down view above the AV (i.e., a birds eye view), for example. As is shown in step 240 FIG. 2, a convolutional network may be applied to map the top down grid to a new set of features while maintaining the original dimensions of the grid. This may be referred to as a "backbone" architecture, and could include for example a U-Net or Hourglass Network. The output of this backbone is what are referred to as deep global features and provide contextual information for each grid cell. The data embedded into (or associated with) a grid may no longer be considered as being shallow point feature data because of contextual data that associates points with the grid. This embedded or associated data may include or be referred to as point to grid cell assignment data. The data embedded into or associated with the grid may be considered or may include the aforementioned deep global features mentioned above, where data from certain points may be linked to data from other points.

After the application of the backbone in step 240, step 250 may include a sequence of two substeps: 1) extract deep global features from the outputs of 240 using point to grid cell mapping from 220 (by using the grid cell assigned to each point as a "look up" index), and 2) concatenating this with shallow point features output from the MLP applied in 220. This creates a set of augmented point features that have shallow features and deep global features. Then, in Step 260 a final multi-layer perceptron (that is shared across points) is applied to these augmented point features to generate interpretable ML outputs. These per point outputs may include a classification, a velocity, information that identifies whether a point belongs to a bounding box, and/or bounding box parameter information for each of the respective data points. When there exists other information offline that is helpful for inference time, this information can also be included among these outputs, added to training, and used at inference to improve the overall AV system.

After step 260, the raw outputs of the machine learning are used for instance segmentation in step 270, which assigns a semantic label to all points (labels include background, pedestrian, vehicle, bike for example) and points classified as non-background classes are grouped according to the object to which they are associated. More specifically, the points classified as foreground are shifted by an offset that pushes the points toward their associated object's centroid; then in step 280, a density-based clustering algorithm/operation like DBSCAN or OPTICS is applied to the results of all these shifted foreground points. Step 290 then uses the resulting clusters to summarize each cluster's object-level information (i.e. object attributes or data). More specifically, the resulting clusters provide object representations but also point-to-cluster associations that can be useful for other state estimation algorithms, like for example kinematic model fitting. Another example of post-processing that can be applied in step 290 is a statistical summarization of bounding box information, like for example Non-Max Suppression which assigns to a cluster the box parameters for the point with the highest foreground confidence in that cluster. The object attributes or data may be identified or estimated based on analysis of the ML outputs.

The methodology shown in FIG. 2 may be referred to as Panoptic Segmentation and includes three main tasks: 1) semantic labeling of all radar points in a scene, 2) instance segmentation via per-point semantic classification, point shifting by an inferred spatial offset for points classified as foreground, and clustering of the shifted foreground points and 3) estimation of a bounding box and any other attributes for each object instance. The data discussed in step 250, 260, and step 270 may be provided in step 280 of FIG. 2 to a downstream process of a sensing apparatus such as tracker. A processor executing instructions of such a tracker may access point, object, or both point and object representation data generated from these steps. For example, a downstream tracker may access point based representations from step 250 when a point-based association and update step is done. On the other hand, if per-point association and updates are not possible due to computational limits or limitations of the tracker implementation, object-level association and updating could be used instead.

The architecture from FIG. 2 (or more specifically, the weights contained in networks from Step 220 through 260) is trained using gradient based optimization techniques in a self-supervised, semi-supervised, weakly supervised, strongly supervised or unsupervised fashion. Examples of such training algorithms include Stochastic Gradient Descent (SGD) and its refinements like Adam, Adagrad, RMSProp, or Adadelta. The training process entails presenting to the model examples of input fused temporally aggregated radar point clouds paired with the supervision, which acts as a target. The SGD algorithm uses losses to define an error between the model's predictions and the desired target; this error is backpropagated through the model to provide a gradient update direction for the weights of the model. Loss functions that define these errors can be crafted in multiple ways, but typical loss functions include various combinations of cross-entropy (for detection and classification) and L1 and L2 losses (for regression). Losses can be trained jointly with homoscedastic learning methods to learn task weightings so that the tasks do not require manual tuning of per-task weights.

Figure 3:
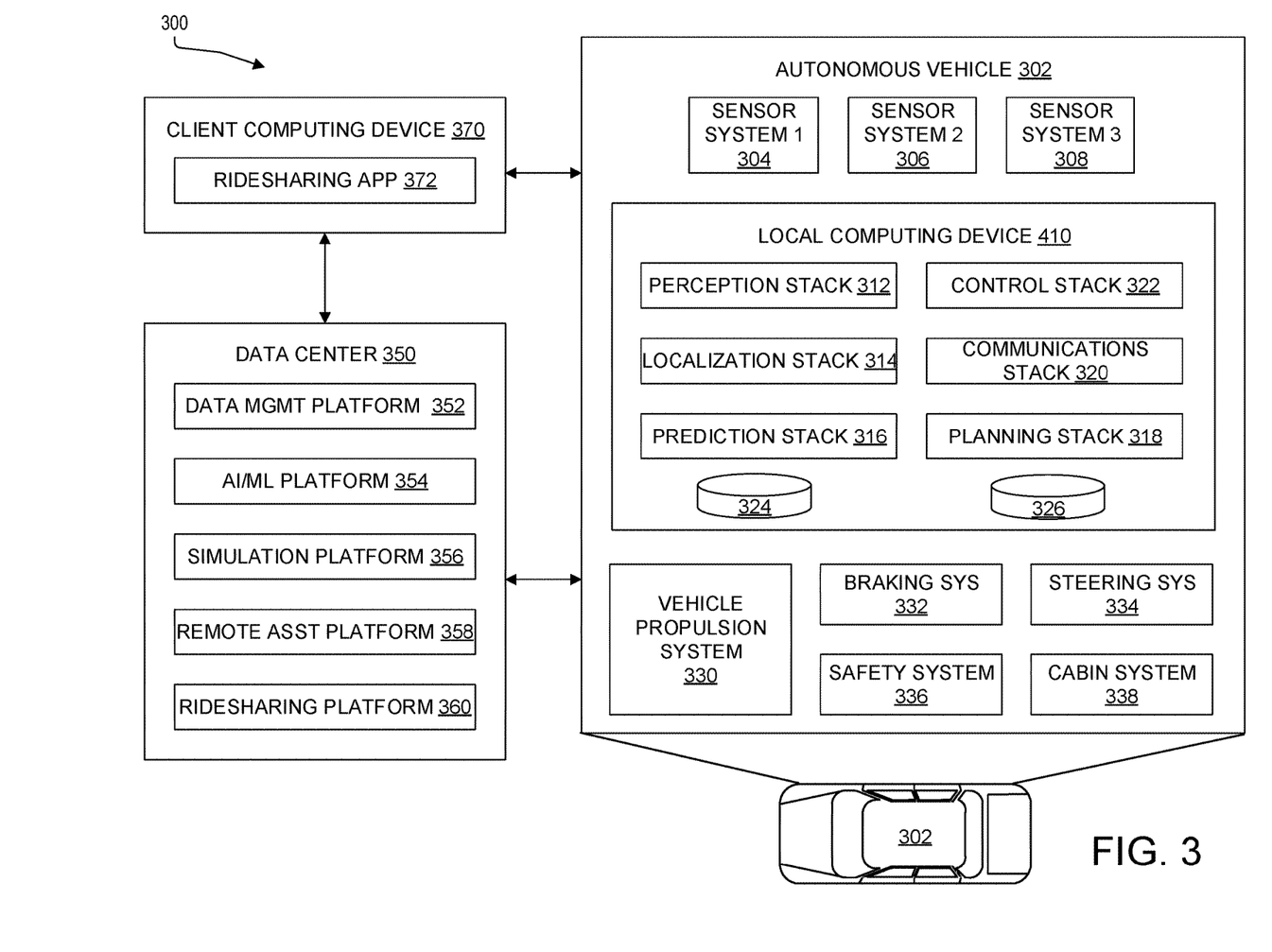
FIG. 3 illustrates an example of a system for managing one or more Autonomous Vehicles (AVs) in accordance with some aspects of the present technology.

FIG. 3 illustrates an example of an AV management system. One of ordinary skill in the art will understand that, for the AV management system 300 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 300 includes an AV 302, a data center 350, and a client computing device 370. The AV 302, the data center 350, and the client computing device 370 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 302 can navigate roadways without a human driver based on sensor signals generated by multiple sensor systems 304, 306, and 308. The sensor systems 304-308 can include different types of sensors and can be arranged about the AV 302. For instance, the sensor systems 304-308 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 304 can be a camera system, the sensor system 306 can be a LIDAR system, and the sensor system 308 can be a RADAR system. Other embodiments may include any other number and type of sensors.

The AV 302 can also include several mechanical systems that can be used to maneuver or operate the AV 302. For instance, the mechanical systems can include a vehicle propulsion system 330, a braking system 332, a steering system 334, a safety system 336, and a cabin system 338, among other systems. The vehicle propulsion system 330 can include an electric motor, an internal combustion engine, or both. The braking system 332 can include an engine brake, brake pads, actuators, and/or any other suitable componentry configured to assist in decelerating the AV 302. The steering system 334 can include suitable componentry configured to control the direction of movement of the AV 302 during navigation. The safety system 336 can include lights and signal indicators, a parking brake, airbags, and so forth. The cabin system 338 can include cabin temperature control systems, in-cabin entertainment systems, and so forth. In some embodiments, the AV 302 might not include human driver actuators (e.g., steering wheel, handbrake, foot brake pedal, foot accelerator pedal, turn signal lever, window wipers, etc.) for controlling the AV 302. Instead, the cabin system 338 can include one or more client interfaces (e.g., Graphical User Interfaces (GUIs), Voice User Interfaces (VUIs), etc.) for controlling certain aspects of the mechanical systems 330-338.

The AV 302 can additionally include a local computing device 310 that is in communication with the sensor systems 304-308, the mechanical systems 330-338, the data center 350, and the client computing device 370, among other systems. The local computing device 310 can include one or more processors and memory, including instructions that can be executed by the one or more processors. The instructions can make up one or more software stacks or components responsible for controlling the AV 302; communicating with the data center 350, the client computing device 370, and other systems; receiving inputs from riders, passengers, and other entities within the AV's environment; logging metrics collected by the sensor systems 304-308; and so forth. In this example, the local computing device 310 includes a perception stack 312, a mapping and localization stack 314, a prediction stack 316, a planning stack 318, a communications stack 320, a control stack 322, an AV operational database 324, and an HD geospatial database 326, among other stacks and systems.

The perception stack 312 can enable the AV 302 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 304-308, the mapping and localization stack 314, the HD geospatial database 326, other components of the AV, and other data sources (e.g., the data center 350, the client computing device 370, third party data sources, etc.). The perception stack 312 can detect and classify objects and determine their current locations, speeds, directions, and the like. In addition, the perception stack 312 can determine the free space around the AV 302 (e.g., to maintain a safe distance from other objects, change lanes, park the AV, etc.). The perception stack 132 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 314 can determine the AV's position and orientation (pose) using different methods from multiple systems (e.g., GPS, IMUs, cameras, LIDAR, RADAR, ultrasonic sensors, the HD geospatial database 322, etc.). For example, in some embodiments, the AV 302 can compare sensor data captured in real-time by the sensor systems 304-308 to data in the HD geospatial database 326 to determine its precise (e.g., accurate to the order of a few centimeters or less) position and orientation. The AV 302 can focus its search based on sensor data from one or more first sensor systems (e.g., GPS) by matching sensor data from one or more second sensor systems (e.g., LIDAR). If the mapping and localization information from one system is unavailable, the AV 302 can use mapping and localization information from a redundant system and/or from remote data sources.

The prediction stack 316 can receive information from the localization stack 314 and objects identified by the perception stack 312 and predict a future path for the objects. In some embodiments, the prediction stack 316 can output several likely paths that an object is predicted to take along with a probability associated with each path. For each predicted path, the prediction stack 316 can also output a range of points along the path corresponding to a predicted location of the object along the path at future time intervals along with an expected error value for each of the points that indicates a probabilistic deviation from that point.

The planning stack 318 can determine how to maneuver or operate the AV 302 safely and efficiently in its environment. For example, the planning stack 316 can receive the location, speed, and direction of the AV 302, geospatial data, data regarding objects sharing the road with the AV 302 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 302 from one point to another and outputs from the perception stack 312, localization stack 314, and prediction stack 316. The planning stack 318 can determine multiple sets of one or more mechanical operations that the AV 302 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 318 can select from multiple backup plans to carry out. For example, while preparing to change lanes to turn right at an intersection, another vehicle may aggressively cut into the destination lane, making the lane change unsafe. The planning stack 318 could have already determined an alternative plan for such an event. Upon its occurrence, it could help direct the AV 302 to go around the block instead of blocking a current lane while waiting for an opening to change lanes.

The control stack 322 can manage the operation of the vehicle propulsion system 330, the braking system 332, the steering system 334, the safety system 336, and the cabin system 338. The control stack 322 can receive sensor signals from the sensor systems 304-308 as well as communicate with other stacks or components of the local computing device 310 or a remote system (e.g., the data center 350) to effectuate operation of the AV 302. For example, the control stack 322 can implement the final path or actions from the multiple paths or actions provided by the planning stack 318. This can involve turning the routes and decisions from the planning stack 318 into commands for the actuators that control the AV's steering, throttle, brake, and drive unit.

The communication stack 320 can transmit and receive signals between the various stacks and other components of the AV 302 and between the AV 302, the data center 350, the client computing device 370, and other remote systems. The communication stack 320 can enable the local computing device 310 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 320 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 326 can store HD maps and related data of the streets upon which the AV 302 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 324 can store raw AV data generated by the sensor systems 304-308, stacks 312-322, and other components of the AV 302 and/or data received by the AV 302 from remote systems (e.g., the data center 350, the client computing device 370, etc.). In some embodiments, the raw AV data can include HD LIDAR point cloud data, image data, RADAR data, GPS data, and other sensor data that the data center 350 can use for creating or updating AV geospatial data or for creating simulations of situations encountered by AV 302 for future testing or training of various machine learning algorithms that are incorporated in the local computing device 310.

The data center 350 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 350 can include one or more computing devices remote to the local computing device 310 for managing a fleet of AVs and AV-related services. For example, in addition to managing the AV 302, the data center 350 may also support a ridesharing service, a delivery service, a remote/roadside assistance service, street services (e.g., street mapping, street patrol, street cleaning, street metering, parking reservation, etc.), and the like.

The data center 350 can send and receive various signals to and from the AV 302 and the client computing device 370. These signals can include sensor data captured by the sensor systems 304-308, roadside assistance requests, software updates, ridesharing pick-up and drop-off instructions, and so forth. In this example, the data center 350 includes a data management platform 352, an Artificial Intelligence/Machine Learning (AI/ML) platform 354, a simulation platform 356, a remote assistance platform 358, and a ridesharing platform 360, among other systems.

The data management platform 352 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 350 can access data stored by the data management platform 352 to provide their respective services.

The AI/ML platform 354 can provide the infrastructure for training and evaluating machine learning algorithms for operating the AV 302, the simulation platform 356, the remote assistance platform 358, the ridesharing platform 360, the cartography platform 362, and other platforms and systems. Using the AI/ML platform 354, data scientists can prepare data sets from the data management platform 352; select, design, and train machine learning models; evaluate, refine, and deploy the models; maintain, monitor, and retrain the models; and so on.

The simulation platform 356 can enable testing and validation of the algorithms, machine learning models, neural networks, and other development efforts for the AV 302, the remote assistance platform 358, the ridesharing platform 360, the cartography platform 362, and other platforms and systems. The simulation platform 356 can replicate a variety of driving environments and/or reproduce real-world scenarios from data captured by the AV 302, including rendering geospatial information and road infrastructure (e.g., streets, lanes, crosswalks, traffic lights, stop signs, etc.) obtained from the cartography platform 362; modeling the behavior of other vehicles, bicycles, pedestrians, and other dynamic elements; simulating inclement weather conditions, different traffic scenarios; and so on.

The remote assistance platform 358 can generate and transmit instructions regarding the operation of the AV 302. For example, in response to an output of the AI/ML platform 354 or other system of the data center 350, the remote assistance platform 358 can prepare instructions for one or more stacks or other components of the AV 302.

The ridesharing platform 360 can interact with a customer of a ridesharing service via a ridesharing application 372 executing on the client computing device 370. The client computing device 370 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 372. The client computing device 370 can be a customer's mobile computing device or a computing device integrated with the AV 302 (e.g., the local computing device 310). The ridesharing platform 360 can receive requests to pick up or drop off from the ridesharing application 372 and dispatch the AV 302 for the trip.

Figure 4:
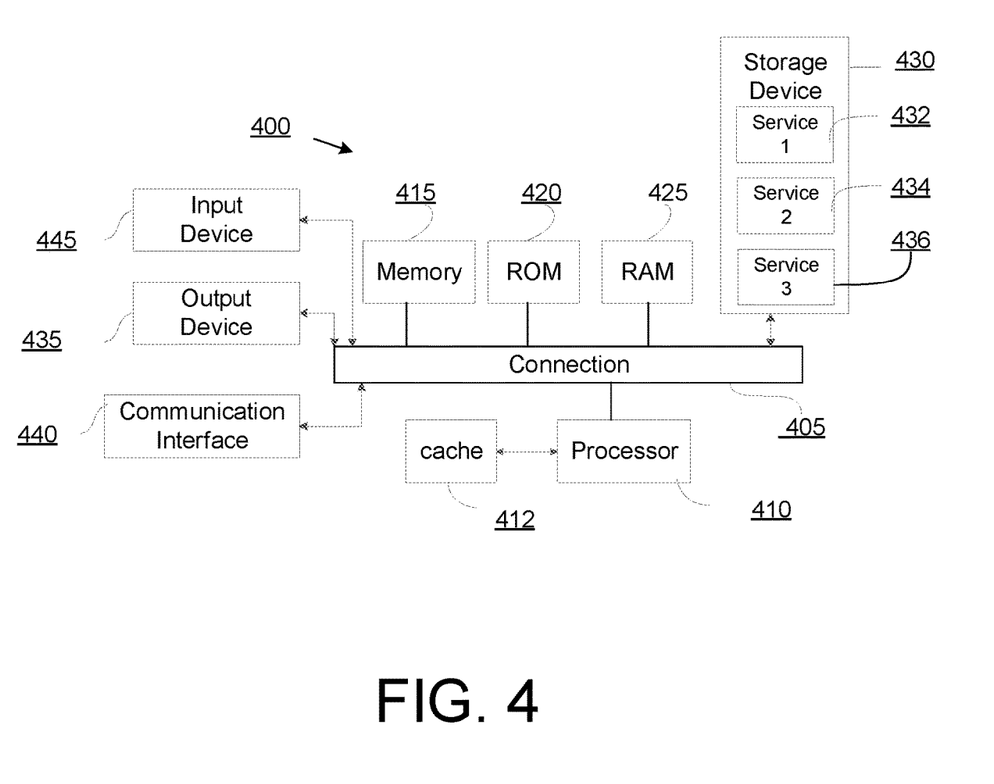
FIG. 4 shows an example of a computing system that may be used to implement at least some of the functions reviewed in the present disclosure in accordance with some aspects of the present technology.

FIG. 4 shows an example of computing system 400 that may be used to implement at least some of the functions reviewed in the present disclosure. In certain instances, a computing device may be incorporated into a sensing apparatus or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read-only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 442, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement, and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

What is claimed is:

1. A method for evaluating radar data, the method comprising:
generating generated current data from a currently received radar signals;
pre-processing both the generated current data and data associated with a set of prior data;
generating a combined dataset that includes data points associated with a combination of the generated current data and the set of prior data, wherein locations of the data points of the combined dataset are identified;
extracting per-point feature data from a set of accessed data based on the identified locations of the data points;
training a machine learning (ML) process;
generating per-point outputs of the ML process based on the ML process receiving the per-point feature data and the combined dataset, the per-point outputs associated with the per-point feature data and the data points of the combined data set, wherein the per-point feature data and the data points of the combined data set are associated with point-wise representations;
organizing the per-point feature data from the set of accessed data and information from the combined dataset into a set of formatted data that associates the data points with respective per-point features;
extracting data from the set of formatted data a set of shallow features, wherein each feature on the set of shallow features corresponds to a single data point of the data points, wherein the set of shallow features does not include data that associates the single point with another data point of the data points;
associating each feature of the set of shallow features to a specific grid cell of a grid around the autonomous vehicle to generate a grid cell to point mapping;
generating a set of deep global features that associate the set of shallow features with the grid cell to point mapping, wherein the deep global features include data that links one point to other points;
post-processing the per-point outputs of the ML process to transform point-wise representations to object representations; and
using the object representations to maneuver or operate an autonomous vehicle.

2. The method of claim 1, further comprising concatenating the set of shallow features with the deep global features to create a set of augmented point features.

3. The method of claim 2, further comprising generating a set of machine learned (ML) outputs from the augmented point features.

4. The method of claim 3, further comprising shifting a location of the single data point toward a centroid associated with an object and the single data point.

5. The method of claim 4, further comprising applying a density-based clustering operation on the shifted single data point.

6. The method of claim 5, further comprising generating object attributes.

7. The method of claim 6, wherein the object attributes include or are associated with one or more objects representing, a point-to-cluster association, a bounding box, or object class.

8. The method of claim 1, wherein the set of deep global features includes the data that associates the single point with the other point of the data points.

9. A non-transitory computer-readable storage medium having embodied thereon a program executable by a processor for implementing a method for evaluating radar data, the method comprising:
generating generated current data from a currently received radar signals;
pre-processing both the generated current data and data associated with a set of prior data;
generating a combined dataset that includes data points associated with a combination of the generated current data and the set of prior data, wherein locations of the data points of the combined dataset are identified;
extracting per-point feature data from a set of accessed data based on the identified locations of the data points;
training a machine learning (ML) process;
generating per-point outputs of the ML process based on the ML process receiving the per-point feature data and the combined dataset, the per-point outputs associated with the per-point feature data and the data points of the combined data set, wherein the per-point feature data and the data points of the combined data set are associated with point-wise representations;
organizing the per-point feature data from the set of accessed data and information from the combined dataset into a set of formatted data that associates the data points with respective per-point features;
extracting data from the set of formatted data a set of shallow features, wherein each feature on the set of shallow features corresponds to a single data point of the data points, wherein the set of shallow features does not include data that associates the single point with another data point of the data points;
associating each feature of the set of shallow features to a specific grid cell of a grid around the autonomous vehicle to generate a grid cell to point mapping;
generating a set of deep global features that associate the set of shallow features with the grid cell to point mapping, wherein the deep global features include data that links one point to other points;
post-processing the per-point outputs of the ML process to transform point-wise representations to object representations; and
using the object representations to maneuver or operate an autonomous vehicle.

10. An apparatus for evaluating radar data, the apparatus comprising:
a radar device that emits and receives radar signals;
a memory; and
a processor that executes instructions out of the memory to:
generate generated current data from the received radar signals;
pre-process both the generated current data and data associated with a set of prior data, wherein the pre-process preserves angles, topological orientations of data points, and information associated with motion vectors of objects in an area around a vehicle while reducing information associated with specific conditions under which the generated current data was generated;

generate a combined dataset that includes data points associated with a combination of the generated current data and the prior data, wherein locations of the data points of the combined dataset are identified;

extract per-point feature data from a set of accessed data based on the identified locations of the data points;

train a machine learning (ML) process;

generate per-point outputs of the ML process based on the ML process receiving the per-point feature data and the combined dataset, the per-point outputs associated with the per-point feature data and the data points of the combined data set, wherein the per-point feature data and the data points of the combined data set are associated with point-wise representations;

organize the per-point feature data from the set of accessed data and information from the combined dataset into a set of formatted data that associates the data points with respective per-point features;

extract data from the set of formatted data a set of shallow features, wherein each feature on the set of shallow features corresponds to a single data point of the data points, wherein the set of shallow features does not include data that associates the single point with another data point of the data points;

associate each feature of the set of shallow features to a specific grid cell of a grid around the autonomous vehicle to generate a grid cell to point mapping;

generate a set of deep global features that associate the set of shallow features with the grid cell to point mapping, wherein the deep global features include data that links one point to other points;

post-process the per-point outputs of the ML process to transform point-wise representations to object representations; and use the object representations to maneuver or operate an autonomous vehicle.

\* \* \* \* \*